US009969620B2

(12) United States Patent
Sankaran et al.

(10) Patent No.: US 9,969,620 B2
(45) Date of Patent: May 15, 2018

(54) NANOSCALE DIAMOND PARTICLES AND METHOD OF FORMING NANOSCALE DIAMOND PARTICLES

(71) Applicant: Case Western Reserve University, Cleveland, OH (US)

(72) Inventors: R. Mohan Sankaran, University Heights, OH (US); John C. Angus, Cleveland Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 299 days.

(21) Appl. No.: 14/674,955

(22) Filed: Mar. 31, 2015

(65) Prior Publication Data
US 2015/0274534 A1 Oct. 1, 2015

Related U.S. Application Data

(60) Provisional application No. 61/972,674, filed on Mar. 31, 2014.

(51) Int. Cl.
*C01B 32/25* (2017.01)
*B01J 19/08* (2006.01)
(Continued)

(52) U.S. Cl.
CPC .............. *C01B 32/25* (2017.08); *B01J 19/088* (2013.01); *C01B 32/26* (2017.08); *C01B 32/28* (2017.08);
(Continued)

(58) Field of Classification Search
CPC .......... C01B 31/06; C01B 32/25; C01B 32/26; C01B 32/28; B01J 19/088; B01J 19/087;
(Continued)

(56) References Cited

U.S. PATENT DOCUMENTS 5,087,434 A * 2/1992 Frenklach ............... C01B 31/06
423/446
7,297,619 B2 11/2007 Sankaran et al.
(Continued)

FOREIGN PATENT DOCUMENTS

CN 104671239 A * 6/2015
EP WO9005701 A * 5/1990
(Continued)

OTHER PUBLICATIONS

Kumar et al, "Formation of nanodiamonds at near-ambient conditions via microplasma dissociation of ethanol vapour," Nature Communications 4 (Oct. 2013); 2618.*
(Continued)

*Primary Examiner* — Ibrahime A Abraham
*Assistant Examiner* — Colleen M Raphael
(74) *Attorney, Agent, or Firm* — Brinks Gilson & Lione

(57) ABSTRACT

A method of forming nanoscale diamond particles comprises providing $C_2$ and CH radicals at a low pressure, and nucleating the $C_2$ and CH radicals to form carbon nanoparticles comprising a diamond phase and a non-diamond phase. The method further comprises removing at least a portion of the non-diamond phase in flight during the nucleation of the $C_2$ and CH radicals to form a carbon powder comprising a plurality of nanoscale diamond particles.

19 Claims, 10 Drawing Sheets

(51) Int. Cl.
C01B 32/26 (2017.01)
C01B 32/28 (2017.01)
(52) U.S. Cl.
CPC .................. B01J 2219/0875 (2013.01); B01J 2219/0883 (2013.01); B01J 2219/0898 (2013.01)
(58) Field of Classification Search
CPC ........ B01J 2219/0883; B01J 2219/0898; B01J 2219/0875
USPC .................................................... 204/157.15
See application file for complete search history.

(56) References Cited

U.S. PATENT DOCUMENTS

| | | | |
|---|---|---|---|
| 8,529,749 | B2 | 9/2013 | Sankaran |
| 8,715,608 | B2 | 5/2014 | Sandaran et al. |
| 2002/0114756 | A1* | 8/2002 | Gruen ................. C23C 14/0605 423/446 |
| 2005/0258419 | A1 | 11/2005 | Sankaran et al. |
| 2007/0104399 | A1* | 5/2007 | Hamza ................... C30B 35/00 118/730 |
| 2007/0272664 | A1* | 11/2007 | Schroder ............... B82Y 30/00 219/121.59 |
| 2009/0229972 | A1 | 9/2009 | Sankaran et al. |
| 2009/0297429 | A1* | 12/2009 | Vohra .................... C30B 25/105 423/446 |

FOREIGN PATENT DOCUMENTS

| | | | | |
|---|---|---|---|---|
| JP | 01164795 | A | * | 6/1989 |
| JP | 02120219 | A | * | 5/1990 ............. C01B 31/06 |

OTHER PUBLICATIONS

Angus, J.C., et al., "Low-Pressure, Metastable Growth of Diamond and "Diamondlike" Phases", Science, vol. 241, 1988, pp. 913-921.
Bachman, P.K., et al., "Towards a General Concept of Diamond Chemical Vapour Deposition", Diam. Rel. Mater., vol. 1, 1991, pp. 1-12.
Badziag, P., et al., "Nanometre-Sized Diamonds Are More Stable Than Graphite", Nature, vol. 343, 1990, pp. 244-245.
Butenko, Y.V., et al., "Photoemission Study of Onionlike Carbons Produced by Annealing Nanodiamonds", Phys. Rev. B, vol. 71, 2005, p. 75420.
Butler, J.E., et al., "Understanding the Chemical Vapor Deposition of Diamond: Recent Progress", J.Phys.: Condens. Matter, vol. 21, 2009, 20p.
Chow, E.K., et al., "Nanodiamond Therapeutic Delivery Agents Mediate Enhanced Chemoresistant Tumor Treatment", Sci. Trans. Med., vol. 3, No. 73, 2001, 73ra21.
Cowley, J.M., et al., "Structures of Carbon Nanocrystals", Chem. Mater., vol. 16, 2004, pp. 4905-4911.
Cunningham, G., et al., "Ozone-Modified Detonation Nanodiamonds", Diam. Rel. Mater., vol. 17, 2008, pp. 650-654.
Dahl, J.E., et al., "Isolation and Structure of Higher Diamondoids, Nanometer-Sized Diamond Molecules", Science, vol. 299, 2003, pp. 96-99.
Dai, Z.R., et al., "Possible in situ Formation of Meteoritic Nanodiamonds in the Early Solar System", Nature, vol. 418, 2002, pp. 157-159.
Danilenko, V.V., "On the History of the Discovery of Nanodiamond Synthesis", Phys. Solid State, vol. 46, No. 4, 2004, pp. 581-584.
Dato, A., et al., "Substrate-Free Gas-Phase Synthesis of Graphene Sheets", Nano Lett., vol. 8, No. 7, 2008, pp. 2012-2016.
Eaton, S.C., et al., "Construction of a New C—H—O Ternary Diagram for Diamond Deposition from the Vapor Phase", Diamonds and Rel. Mater., vol. 9, pp. 1320-1326, 2000.
Ehrenfreung, P., et al., Organic Molecules in the Interstellar Medium, Comets, and Meteorites: A Voyage from Dark Clouds to the Early Earth, Ann. Rev. Astron. Astrophys., vol. 38, 2000, pp. 427-483.

Ferrari, A.C., et al., "Raman Spectroscopy of Amorphous, Nanostructured, Diamond-Like Carbon, and Nanodiamond", Phil. Trans. R. Soc. Lond. A, vol. 362, 2004, pp. 2477-2512.
Frenklach, M., et al., "Induced Nuclean of Diamond Powder", Appl. Phys. Lett., vol. 59, 1991, pp. 546-548.
Frondel, C., et al, "A Hexagonal Polymorph of Diamond", Nature, vol. 214, 1967, pp. 587-589.
Gogotsi, Y., et al., "Conversion of Silicon Carbide to Crystalline Diamond-Structured Carbon at Ambient Pressure", Nature, vol. 411, 2001, pp. 283-287.
Goyette, A.N., et al., "$C_2$ Swan Band Emission Intensity as a Function of $C_2$ Density", Plasma Sources Sci. Technol., vol. 7, 1998, pp. 149-153.
Greiner, N.R., et al., "Diamonds in Detonation Soot", Nature, vol. 333, 1988, pp. 440-442.
Gruen, D.M., "Nanocrystalline Diamond Films", Annu. Rev. Mater. Sci., vol. 29, 1999, pp. 211-259.
Haerle, R., et al. "$sp^2/sp^3$ Hybridization Ratio in Amorphous Carbon from C 1s Core-Level Shifts: X-Ray Photoelectron Spectroscopy and First-Principles Calculation", Phys. Rev. B, vol. 65, 2001, p. 45101.
Hirai, H., et al., "Modified Phases of Diamond Formed Under Shock Compression and Rapid Quenching", Science, vol. 253, 1991, pp. 772-774. (abstract only).
Jiao, S., et al., "Microstructure of Ultrananocrystalline Diamond Films Grown by Microwave Ar—CH4 Plasma Chemical Vapor Deposition With or Without Added $H_2$", J. Appl. Phys., vol. 90, No. 118, 2001, pp. 118-122.
Karczemska, A., et al. "Extraterrestrial, Terrestrial and Laboratory Diamonds—Differences and Similarities", Diam. Relat. Mater., vol. 17, 2008, pp. 1179-1185.
Kortshagen, U., "Nonthermal Plasma Synthesis of Semiconductor Nanocrystals", J. Phys. D, vol. 42, 2009, p. 113001.
Krüger, A., et al., "Unusually Tight Aggregation in Detonation Diamond: Identification and Disintegration", Carbon N.Y., vol. 43, 2005, pp. 1722-1730.
Kumar, A., et al., "Formation of Nanodiamonds at Near-Ambient Conditions via Microplasma Disassociation of Ethanol Vapour", Nature Communications, 4:2618, DOI:10.1038/ncomms3618, Oct. 21, 2013, 8p. www.nature.com/naturecommunications.
Lam, R., et al., "Nanodiamond-Embedded Microfilm Devices for Localized Chemotherapeutic Elution", ACS Nano, vol. 2, No. 10, 2008, pp. 2095-2102.
Lander, J.J., et al., "Low Energy Electron Diffraction Study of the (111) Diamond Surface", Surf. Sci., vol. 4, 1996, pp. 241-246.
Lewis, R.S., et al., "Interstellar Diamonds in Meteorites", Nature, vol. 326, 1987, pp. 160-162.
Mariotti D., et al., "Microplasmas for Nanomaterials Synthesis", J. Phys. D., vol. 43, 2010, p. 323001.
Marks, N.A., et al., "Nonequilibrium Route to Nanodiamond with Astrophysical Implications", Phys. Rev. Lett, vol. 108, 2012, p. 75503.
Mochalin, V.N., et al., "The Properties and Applications of Nanodiamonds", Nat. Nanotech., vol. 7, 2012, pp. 11-23.
Mucha, J.A., et al., "On the Role of Oxygen and Hydrogen in Diamond-Forming Discharges", J. Appl. Phys, vol. 65, 1989, pp. 3448-3452.
Osswald, S. et al., "Control of $sp^2/Sp^3$ Carbon Ratio and Surface Chemistry of Nanodiamond Powders by Selective Oxidation in Air", J. Am. Chem. Soc., vol. 128, 2006, pp. 11635-11642.
Osswald, S., et al., "Phonon Confinement Effects in the Raman Spectrum of Nanodiamond", Phys. Rev. B, vol. 80, 2009, p. 75419.
Petit, T., et al., "Early Stages of Surface Graphitization on Nanodiamond Probed by X-Ray Photoelectron Spectroscopy", Phys. Rev. B, vol. 84, 2011, p. 233407.
Raty, J.Y., et al., "Ultradispersity of Diamond at the Nanoscale", Nat. Mater., vol. 2, 2003, pp. 792-795.
Robertson, J., "Diamond-Like Amorphous Carbon", Mater. Sci. Eng. R, vol. 37, 2002, 129-281.
Sankaran, R. M., et al., "Synthesis of Blue Luminescent Si Nanoparticles Using Atmospheric-Pressure Microdischarges", Nano Lett., vol. 5, No. 3, 2005, pp. 537-541.

(56) References Cited

OTHER PUBLICATIONS

Sankaran, R.M., et al., "Hollow Cathode Sustained Plasma Microjets: Characterization and Application to Diamond Deposition", *J. Appl. Phys.*, vol. 92, No. 5, 2002, pp. 2406-2411.

Singh, T., et al., "First-Principles Theoretical Analysis of Pure and Hydrogenated Crystalline Carbon Phases and Nanostructures", *Chem. Phys. Lett.*, vol. 474, 2009, pp. 168-174.

Spitsyn, B.V., et al., "Vapor Growth of Diamond on Diamond and Other Surfaces", *J. Cryst. Growth*, vol. 52, 1981, pp. 219-226.

Su, Z., et al., "New Insight into the Soot Nanoparticles in a Candle Flame", *Chem. Comm.*, vol. 47, 2011, pp. 4700-4702.

Vandenbulcke, L., et al., "Nanodiamonds in Dusty Low-Pressure Plasmas", *Appl. Phys. Lett.*, vol. 94, 2009, p. 44106.

Wang, C.S., et al. "Effect of $H_2$/Ar Plasma on Growth Behavior of Ultra-Nanocrystalline Diamond Films: The TEM Study", *Diam. Re. Mater.*, vol. 19, 2010, pp. 138-142.

Wen, Bin, et al., "Hydrogen-Doped Cubic Diamond and the Crystal Structure of N-Diamond", *Chem. Phys. Lett.*, vol. 516, 2011, pp. 230-232.

Yeganeh, M., et al., "Atomic Hydrogen Treatment of Nanodiamond Powder Studied with Photoemission Spectroscopy", *Phys. Rev. B*, vol. 75, 2007, pp. 155404-155412.

Yoshikawa, M., et al. "Raman Scattering from Nanometer-Sized Diamond", *Appl. Phys. Lett.*, vol. 67, 1995, pp. 694-696.

Zhou, D., et al., "Control of Diamond Film Microstructure by Ar Additions to $CH_4/H_2$ Microwave Plasmas", *J. Appl. Phys.*, vol. 84, No. 4, 1998, pp. 1981-1989.

\* cited by examiner

210. Providing $C_2$ and CH radicals

220. Nucleating the $C_2$ and CH radicals to form carbon nanoparticles comprising a diamond phase and a non-diamond phase 230. Quenching the nucleating of the $C_2$ and CH radicals to limit the size of the nanoparticles to the nanometer size regime 240. Removing at least a portion of the non-diamond phase in flight during the nucleation of the $C_2$ and CH radicals to form a carbon powder comprising a plurality of nanoscale diamond particles 250. Collecting the carbon powder comprising a plurality of nanoscale diamond particles 260. Analyzing the carbon powder comprising a plurality of nanoscale diamond particles

310. Providing a plasma at a low pressure

320. Continuously introducing a vapor of a carbon feed into the plasma, the vapor dissociating in the plasma to form free radicals 330. Nucleating the free radicals to form carbon nanoparticles comprising a diamond phase and a non-diamond phase 340. Removing at least a portion of the non-diamond phase in flight during the nucleation of the free radicals to form a carbon powder comprising a plurality of nanoscale diamond particles 350. Collecting the carbon powder comprising a plurality of nanoscale diamond particles 360. Analyzing the carbon powder comprising a plurality of nanoscale diamond particles

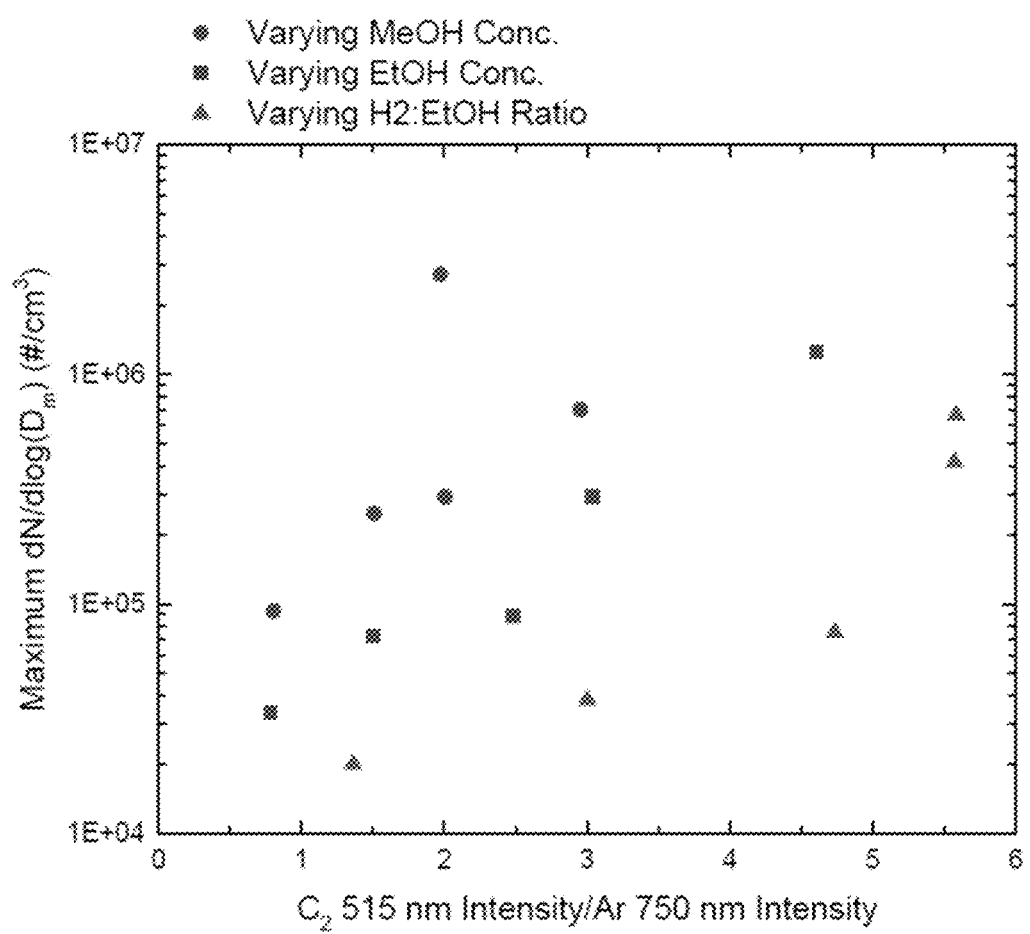

NANOSCALE DIAMOND PARTICLES AND METHOD OF FORMING NANOSCALE DIAMOND PARTICLES

The present application claims priority to U.S. Provisional Patent Application No. 61/972,674, filed Mar. 31, 2014, the entirety of which is incorporated herein by reference.

This invention was made with government support under CBET-0746821; CTS-0649655 awarded by National Science Foundation. The government has certain rights in the invention.

TECHNICAL FIELD

The present disclosure relates to a method of making nanoparticles, more specifically a method of making nanodiamonds.

BACKGROUND

Carbon exists as a variety of different forms at the bulk and nanoscale including graphite, diamond, fullerenes, carbon nanotubes, graphene and nanodiamonds. Graphitic carbon is known to be the most stable form of bulk carbon at ambient temperature and pressure, with high pressures and high temperatures typically required to convert non-diamond phases to diamond. Nanodiamonds have been synthesized for research by several methods including detonation of carbon-containing explosives and plasma-enhanced chemical vapor deposition (PECVD). Despite the predicted stability of nanodiamonds, these processes require high pressure and/or high temperature and produce mixtures of non-diamond and diamond phases. Detonation synthesis is carried out at extremely high pressures and temperatures and produces soot containing large quantities of graphitic carbon in addition to the diamond phase. PECVD produces films of amorphous carbon (a-C) with nanodiamonds embedded at the grain boundaries by deposition at high temperatures.

BRIEF SUMMARY

In one aspect, a method of forming nanoscale diamond particles comprises providing $C_2$ and CH radicals at a low pressure, and nucleating the $C_2$ and CH radicals to form carbon nanoparticles comprising a diamond phase and a non-diamond phase. The method further comprises removing at least a portion of the non-diamond phase in flight during the nucleation of the $C_2$ and CH radicals to form a carbon powder comprising a plurality of nanoscale diamond particles.

In another aspect, a method of forming nanoscale diamond particles comprises providing a plasma at a low pressure, and continuously introducing a vapor of a carbon feed into the plasma. The vapor dissociates in the plasma to form free radicals. The method also comprises nucleating the free radicals to form a carbon powder comprising a plurality of nanoscale diamond particles.

In still another aspect, a method of forming nanoscale diamond particles comprises providing a plasma at a low pressure, and continuously flowing a vapor of a carbon feed into the plasma. The vapor of the carbon feed dissociates in the plasma to form free radicals. The method further comprises nucleating the free radicals to form carbon nanoparticles comprising a diamond phase and a non-diamond phase, and etching the non-diamond phase of the carbon nanoparticles in flight during the nucleation of the free radicals to form a carbon powder comprising a plurality of nanoscale diamond particles.

BRIEF DESCRIPTION OF THE FIGURES

FIG. 1 illustrates a process for forming nanoscale diamond particles according to one embodiment of the present disclosure.

FIG. 2 illustrates a process for forming nanoscale diamond particles according to another embodiment of the present disclosure.

(FIG. 3b; from bottom to top: +450 ppm $H_2$, 180 ppm ethanol vapor). Dissociation of ethanol vapor is monitored by OES (FIG. 3c). The $C_2$ band, which has been linked to nanodiamond formation, is clearly observed from 460 to 570 nm (left panel). The addition of $H_2$ gas results in the appearance of the $H_\alpha$ Balmer line at 656 nm, confirming atomic hydrogen (right panel). (FIG. 3c; from bottom to top: Ar only, 180 ppm ethanol vapor, +450 ppm $H_2$, +10,000 ppm $H_2$)

(FIG. 4a) Micro Raman spectra of carbon nanoparticles synthesized with only ethanol vapor (black) and with ethanol vapor and $H_2$ gas (gray). The addition of $H_2$ gas results in a shift of the broad feature near 1,400 $cm^{-1}$ to lower wavenumber. Deconvolution and fitting of this feature shows (inset of FIG. 4a) evidence of a peak at 1,307 $cm^{-1}$ that agrees with phonon-confined scattering from nanodiamonds. Excitation wavelength of 325 nm was used for all Raman spectra. (FIG. 4b) XRD patterns of carbon nanoparticles synthesized with only ethanol vapor (black) shows no crystalline peaks, suggesting an amorphous material. In comparison, the addition of $H_2$ gas results in crystalline peaks (gray) that can be indexed to crystalline planes of lonsdaleite (L) and cubic diamond (CD) phases. (FIG. 4c and FIG. 4d) High-resolution C 1 s XPS spectra of carbon nanoparticles synthesized with only ethanol vapor (FIG. 4c) and with ethanol vapor and $H_2$ gas (FIG. 4d). The different components corresponding to various chemical shifts of carbon bonds are indicated. The addition of $H_2$ gas increases the ratio of the $sp^3/sp^2$-hybridized carbon peak.

(FIG. 5b). SAED confirms that the particles are crystalline (inset of FIG. 5b). EDX shows that the particles are metal-free (Cu peaks are from the TEM grid). Scale bar, 5 nm (FIG. 5c). Histogram of the particle diameters as measured from TEM analysis of ~250 particles shows that the particles are primarily between 2 and 5 nm (FIG. 5d).

(FIG. 7a and FIG. 7b) High-resolution transmission electron microscopy images of two nanodiamond particles aligned with the electron beam and imaged along the (010) (FIG. 7a) and (110) (FIG. 7b) zone axes. Corresponding FFT images (insets of FIG. 7a and FIG. 7b) and inverse FFT images (FIG. 7c and FIG. 7d) confirm that the particles are lonsdaleite (FIG. 7a and FIG. 7c) and n-diamond (FIG. 7b and FIG. 7d), respectively. Scale bars, 2 nm.

FIGS. 8a and 8b illustrate formation of nanodiamond using methanol and ethanol as feed carbon. Higher O and H content relative to C in methanol results in lower $C_2$ density and higher particle yield.

DETAILED DESCRIPTION

Figure 3A:
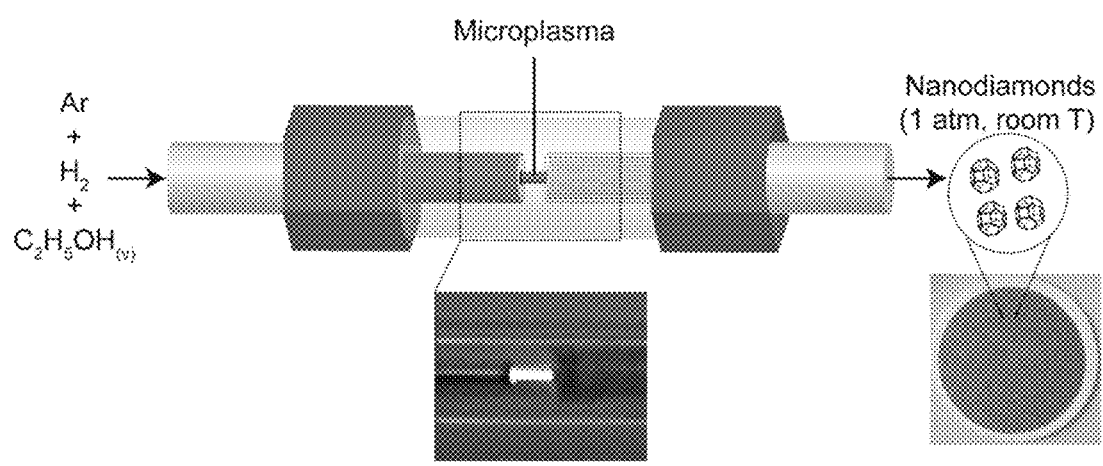
FIGS. 3a-3c illustrate gas-phase nucleation and in situ characterization of carbon nanoparticles. Carbon nanoparticles are synthesized in the gas phase by continuously dissociating a mixture of Ar, $H_2$ gas and ethanol vapor in an atmospheric pressure microplasma (FIG. 3a). Scale bar, 5 mm. The aerosol particles are collected as a dry product by filtration. Aerosol size classification confirms nanoparticle formation and shows that the addition of $H_2$ gas reduces the particle concentration and geometric mean diameter (Dpg). Error bars correspond to the standard error calculated from the geometric standard deviation (sg). Scale bar, 5 mm.

Clusters of diamond-phase carbon, known as nanodiamonds, exhibit novel mechanical, optical and biological properties that have elicited interest for a wide range of technological applications. It is predicted that at the nanoscale, hydrogen-terminated tetrahedral hydrocarbons, precursors to diamond phases, are thermodynamically more stable than polycyclic aromatics, precursors to graphitic phases, with a transition in the phase stability occurring at ~3 nm. This idea supports the existence of naturally formed diamond clusters, referred to as nanodiamonds, in petroleum, interstellar dust and candle flames, all presumably formed at pressures and/or temperatures outside the stability field of bulk diamond.

Although diamond is predicted to be more stable than graphite at the nanoscale, extreme environments are typically used to produce nanodiamonds. Nanoparticles can be homogeneously nucleated in a plasma process, which has the potential to produce nanodiamonds at significantly lower pressures and temperatures and higher purities. However, this approach has thus far been limited to non-diamond carbon and larger diamond particles (~0.1 μm).

According to one embodiment of the present disclosure, a method of forming nanodiamonds is provided where nanodiamonds can be stably formed in the gas phase at atmospheric pressure and neutral gas temperatures <100° C. by dissociation of ethanol vapor or methanol vapor or a combination thereof in a novel microplasma process. Addition of hydrogen gas to the process allows in flight purification by selective etching of the non-diamond carbon and stabilization of the nanodiamonds. The nanodiamond particles are predominantly between 2 and 5 nm in diameter, and exhibit cubic diamond, n-diamond and lonsdaleite crystal structures, similar to nanodiamonds recovered from meteoritic residues. These results may help explain the origin of nanodiamonds in the cosmos, and offer a simple and inexpensive route for the production of high-purity nanodiamonds.

According to another embodiment of the present disclosure, a method of forming nanodiamonds is provided where nanodiamonds are synthesized at near-ambient conditions using a novel continuous atmospheric pressure, microscale plasma (microplasma) process. Particles are homogeneously nucleated by dissociating ethanol vapor, or methanol vapor or a combination thereof and rapidly quenched with reaction times <1 ms to limit the size of the particles to the nanometer-size regime. By adding $H_2$ gas, the non-diamond phase is etched and the diamond phase is stabilized, leading to a highly purified as-grown nanodiamond product. The particles exhibit a uniform diameter of ca. 3.0 nm, and cubic diamond, lonsdaleite and the less frequently observed n-diamond phases similar to presolar nanodiamonds recovered from meteorites. The formation of nanodiamonds at near-ambient conditions confirms their remarkable stability and could help realize new technologies such as drug delivery and the coating of polymeric substrates.

According to yet another embodiment of the present disclosure, a method of forming nanoscale diamond particles is provided. The method comprises providing $C_2$ and CH radicals, and nucleating the $C_2$ and CH radicals to form carbon nanoparticles. Preferably, the $C_2$ and CH radicals are provided at a pressure lower than the extremely high pressures used in an intonation process for diamond formation, more preferably at a low pressure. The term "low pressure" is defined as a pressure of about atmospheric pressure or lower. The low pressure can be lower down to ~1 Torr (1/1,000 of atmospheric pressure). Preferably, the $C_2$ and CH radicals are provided in a flow, more preferably, in a continuous flow. The carbon nanoparticles comprise a diamond phase and a non-diamond phase. The method further comprises removing at least a portion of the non-diamond phase in flight during the nucleation of the $C_2$ and CH radicals to form a carbon powder comprising a plurality of nanoscale diamond particles.

In one example, a carbon feed is dissociated to form the $C_2$ and CH radicals at a low pressure. For example, a vapor of the carbon feed is flown into a plasma at a low pressure to form the continuous flow of $C_2$ and CH radicals. Preferably, the carbon feed is composed of at least carbon and hydrogen. Preferably, oxygen is also included in the carbon feed, either as a molecular component of the carbon feed or added as a gas together with the carbon feed. Preferably, either $H_2$, $O_2$, $CO_2$, $H_2O$ or a combination thereof is added to the carbon feed. Preferably, the carbon feed has a suitable C/(C+O), H/(H+C), and/or O/(O+H) ratio for diamond formation. For example, the carbon feed may have a C/(C+O) ratio of about 0.45 to about 0.57. Preferably, the carbon feed has a C/(C+O) ratio of about 0.5. In another example, the carbon feed may have a H/(H+C) ratio of about 1.0 to about 0.977. In still another example, the carbon feed may have an O/(O+H) ratio of about 0 to about 0.1. In some examples, either $H_2$, $O_2$, $CO_2$, $H_2O$ or a combination thereof is added to the carbon feed to maintain a suitable C/(C+O), H/(H+C), and/or O/(O+H) ratio for diamond formation. In one example, the ratio of O:C is close to 1 or less. In another example, the carbon feed is selected from the group consisting of an alcohol, CO, $CO_2$, a low-carbon alkane, alkene or alkyne, a ketone, and a combination thereof. In one example, the carbon feed is mixed with either $H_2$, $O_2$, $CO_2$, $H_2O$ or a combination thereof, preferably, with $H_2$, and/or $O_2$. The alcohol can be methanol or ethanol. The low-carbon alkane, alkene or alkyne may have 1-6 carbons. In one example, the low-carbon alkane, alkene or alkyne can be $CH_4$, $C_2H_6$, $C_2H_4$ and $C_2H_2$. The ketone can be acetone. Preferably, the carbon feed is methanol, ethanol, or a combination thereof. Preferably, the carbon feed is a mixture of a low carbon alkane, alkene or alkyne with $H_2$ or $O_2$, such as a mixture of an alkane with $H_2$ or $O_2$, a mixture of an alkene with $H_2$ or $O_2$, or a mixture of an alkyne with $H_2$ or $O_2$. In one example, the carbon feed is $CH_4$ mixed with $H_2$ or $O_2$.

In one example, the $C_2$ and CH radicals are formed by dissociating a carbon feed in a DC atmospheric-pressure plasma, a low pressure plasma, a microwave powered plasma, a radio frequency powered plasma or other plasma generated at about atmospheric pressure. Different plasmas are described in J. Angus et al. "Low-Pressure, Metastable Growth of Diamond and "Diamondlike" Phases," *Science*, v. 241, pp. 913-921, which is hereby incorporated by reference.

Preferably, the nucleation process is quickly quenched shortly after the $C_2$ and CH radicals start nucleating to form carbon nanoparticles. The quenching timing will affect the size of the resultant carbon nanoparticles. The earlier the quenching occurs, the less reaction time for $C_2$ and CH radicals to nucleate to form carbon nanoparticles, and thus smaller carbon nanoparticles are obtained. Conversely, the later the quenching occurs, the more reaction time for $C_2$ and CH radicals to nucleate to form carbon nanoparticles, and thus larger carbon nanoparticles are obtained. In one example, carbon nanoparticles are homogeneously nucleated by dissociating a vapor of a carbon feed and rapidly quenched with reaction times <1 ms to limit the size of the carbon nanoparticles to the nanometer-size regime. In another example, the reaction time is limited to about 0.1 ms or less, more preferably about 0.01 ms or less, and even more preferably about 0.001 ms or less, by rapid quenching. Preferably, the nucleation is quenched, allowing limited reaction time to obtain carbon nanoparticles with an average size of about 10 nm or less, preferable about 5 nm or less, more preferably about 3 nm or less.

Preferably, at least a portion of the non-diamond phase in the carbon nanoparticles is removed. More preferably, the non-diamond phase in the carbon nanoparticles is removed in flight during the formation of the carbon nanoparticles. In one example, the non-diamond phase in the carbon nanoparticles is removed by etching. Any suitable etchant that removes non-diamond phase can be used. For example, hydrogen and/or oxygen can be used as an etchant. In one example, hydrogen gas, preferably hydrogen radicals, is introduced to the free radicals of the carbon feed during nucleation, where the hydrogen radicals etch away the non-diamond phase in the formed carbon nanoparticles. The etching process provides purified nanoscale diamond particles with a stabilized diamond phase. Preferably, an etchant, such as hydrogen or oxygen, is introduced together with the continuous flow of $C_2$ and CH radicals.

Preferably, the continuous flow of $C_2$ and CH radicals are provided at a temperature of about 1,000° C. or less, preferably about 500° C. or less, more preferably about 300° C. or less, even more preferably about 200° C. or less, and further more preferably about 100° C. or less.

According to still another embodiment of the present disclosure, another method of forming nanoscale diamond particles is provided. The method comprises providing a plasma at a low pressure, and continuously introducing a vapor of a carbon feed into the plasma. The vapor dissociates in the plasma to form free radicals. The method further comprises nucleating the free radicals to form a carbon powder comprising a plurality of nanoscale diamond particles.

Preferably, the vapor of the carbon feed is continuously introduced into the microplasma at a temperature of about 1,000° C. or less, preferably about 500° C. or less, more preferably about 300° C. or less, even more preferably about 200° C. or less, and further more preferably about 100° C. or less.

In one example, the vapor of carbon feed further comprises a carrier gas. For example, the carrier gas can be an inert gas, such as He, Ne, Ar, Kr, preferably Ar. In another example, the method further comprises introducing hydrogen and/or oxygen gas into the plasma. Some hydrogen and/or oxygen gas dissociates to form hydrogen and/or oxygen radicals. The hydrogen and/or oxygen radicals etch away the non-diamond phase in the formed carbon powder. The etching process provides purified nanoscale diamond particles with a stabilized diamond phase. Preferably, hydrogen and/or oxygen is introduced together with the vapor of a carbon feed. In one example, the purified nanoscale diamond particles have a concentration in the carbon powder of at least about 50% by weight. In another example, the purified nanoscale diamond particles have a concentration in the carbon powder of at least about 60% by weight. In still another example, the purified nanoscale diamond particles have a concentration in the carbon powder of at least about 70% by weight. In yet another example, the purified nanoscale diamond particles have a concentration in the carbon powder of at least about 80% by weight. In a further example, the purified nanoscale diamond particles have a concentration in the carbon powder of at least about 87% by weight.

The nanoscale diamond particles formed according to the methods in the present disclosure may vary. The nanoscale diamond particles may comprise one or more crystal structures selected from the group consisting of lonsdaleite, cubic diamond, and n-diamond.

The size of the nanoscale diamond particles formed according to the methods in the present disclosure may vary. In one example, the average particle size is about 10 nm or less. In another example, the average particle size is about 5 nm or less. In yet another example, the average particle size is about 3 nm or less.

According to yet still another embodiment of the present disclosure, a method of forming nanoscale diamond particles is provided. The method comprises providing a plasma at a low pressure, and continuously flowing a vapor of a carbon feed into the plasma. The vapor of the carbon feed dissociates in the plasma to form free radicals. The method further comprises nucleating the free radicals to form carbon nanoparticles comprising a diamond phase and a non-diamond phase. The method also comprises etching the non-diamond phase of the carbon nanoparticles in flight during the nucleation of the free radicals to form a carbon powder comprising a plurality of nanoscale diamond particles.

According to a further embodiment of the present disclosure, a method of forming nanoscale diamond particles comprises dissociating a suitable hydrocarbon precursor into $C_2$ and CH radicals. In some examples, radicals other than $C_2$ and CH may also be formed in the dissociation process. The method further comprises nucleating the radicals to form carbon nanoparticles. Preferably, the particle growth is quenched to limit the size of the carbon nanoparticles. In one example, the size of the nanoparticles is limited to the nanometer size range (< about 5 nm, preferably < about 3 nm). The method can also comprise stabilizing and etching the diamond-phase material by removing the non-diamond phase in the carbon nanoparticles in flight.

According to a still further embodiment of the present disclosure, a method of forming nanoscale diamond particles is provided. The method comprises continuously generating a microplasma at atmospheric pressure, and flowing a carrier gas comprising an alcohol vapor into the microplasma. The alcohol vapor dissociates in the microplasma. The dissociated alcohol vapor nucleates to form a carbon powder comprising a plurality of nanoscale diamond particles.

In one example, the nanoscale diamond particles have a concentration in the carbon powder of at least about 50% by weight. In another example, the concentration of the nanoscale diamond particles is at least about 60% by weight. In one example, the nanoscale diamond particles are spherical.

The nanoscale diamond particles formed according to the method in present embodiment may vary. The nanoscale diamond particles may comprise one or more crystal structures selected from the group consisting of lonsdaleite, cubic diamond, and n-diamond.

The size of the nanoscale diamond particles formed according to the method of the present embodiment may vary. In one example, the average particle size is about 10 nm or less. In another example, the average particle size is about 5 nm or less. In yet another example, the average particle size is about 3 nm or less. In one example, the nanoscale diamond particles are unagglomerated.

Preferably, the carrier gas comprises an inert gas. Preferably, the inert gas comprises Ar. Preferably, a neutral species gas temperature in the microplasma is about 100° C. or less.

In one example, the method further comprises purifying the carbon powder by removing a non-diamond phase in the carbon powder. Preferably, the non-diamond phase in the carbon powder is removed in flight during the formation of the carbon powder. Preferably, the non-diamond phase in the carbon powder is removed in an etching process. In one example, hydrogen or oxygen gas is flown into the microplasma. Some hydrogen or oxygen gas in the microplasma dissociates into hydrogen or oxygen radicals. The hydrogen or oxygen gas and radicals etch the non-diamond phase in the carbon powder.

Preferably, hydrogen etching removes the non-diamond phase in the carbon powder in flight during the formation of the carbon powder. Preferably, hydrogen gas has a concentration of from about 1,000 p.p.m. to about 12,000 p.p.m. in the microplasma. In one example, the concentration of the hydrogen gas is from about 8,000 p.p.m. to about 12,000 p.p.m.

In one example, the microplasma is continuously generated at a constant current of from about 1 mA to about 6 mA. In another example, the carrier gas is flowed into the microplasma at a flow rate of from about 10 s.c.c.m to about 500 s.c.c.m.

In one example, the alcohol vapor comprises at least one of ethanol and methanol. In another example, the alcohol vapor comprises a mixture of ethanol and methanol. Preferably, a concentration of the alcohol vapor in the carrier gas is from about 10 ppm to about 500 ppm. In one example, the concentration is from about 100 ppm to about 250 ppm. In another example, the concentration is from about 150 ppm to about 200 ppm.

According to a still further embodiment of the present disclosure, nanodiamonds are formed at near ambient conditions (atmospheric pressure and <100° C.) by homogeneous nucleation in a microplasma process. The as-synthesized product is a mixture of diamond and nanodiamond phases, and the purity of the diamond phase can be increased by the addition of $H_2$ (to at least ~90%, as assessed by XPS).

The aerosol product in the microplasma can be collected by filtration to obtain a powder, or deposited directly onto substrates, for example, by (electrostatic) spraying to coat materials at room conditions. The nanodiamonds according to the embodiments of the present disclosure can be modified, for example, doped or surface functionalized during nucleation (in situ) or after powder formation. According to one embodiment of the present disclosure, reactive precursor molecules are dissociated non-thermally. Short residence times ($10^{-3}$-$10^{-6}$ seconds) limit the size of the carbon nanoparticles to the nanometer range.

Referring to FIG. 1, a method for forming nanoscale diamond particles according to one embodiment of the present disclosure is described. The flowchart is merely an example, which should not unduly limit the scope of the present disclosure. One of ordinary skill in the art would recognize many variations, alternatives, and modifications. The method 200 includes step 210 for providing $C_2$ and CH radicals, step 220 for nucleating the $C_2$ and CH radicals to form carbon nanoparticles comprising a diamond phase and a non-diamond phase, step 230 for quenching the nucleating of the $C_2$ and CH radicals to limit the size of the nanoparticles to the nanometer size regime, step 240 for removing at least a portion of the non-diamond phase in flight during the nucleation of the $C_2$ and CH radicals to form a carbon powder comprising a plurality of nanoscale diamond particles, step 250 for collecting the carbon powder comprising a plurality of nanoscale diamond particles, and step 260 for analyzing the carbon powder comprising a plurality of nanoscale diamond particles.

Referring to FIG. 2, a method for forming nanoscale diamond particles according to another embodiment of the present disclosure is described. The method 300 includes step 310 for providing a plasma at a low pressure, step 320 for continuously introducing a vapor of a carbon feed into the plasma, the vapor dissociating in the plasma to form free radicals, step 330 for nucleating the free radicals to form carbon nanoparticles comprising a diamond phase and a non-diamond phase, step 340 for removing at least a portion of the non-diamond phase in flight during the nucleation of the free radicals to form a carbon powder comprising a plurality of nanoscale diamond particles, step 350 for collecting the carbon powder comprising a plurality of nanoscale diamond particles, and step 360 for analyzing the carbon powder comprising a plurality of nanoscale diamond particles.

Not wishing to be bound by any theory, there are several possible reasons why the process in the present disclosure is capable of producing nanodiamonds at near-ambient conditions. The microplasma process is comparable to PECVD and the combination of plasma dissociation and gas-phase chemistry may aid the nucleation of diamond-phase carbon analogous to chemical vapor deposition (CVD) diamond. Similar to CVD, atomic hydrogen may kinetically etch the non-diamond $sp^2$ carbon and allow diamond-phase $sp^3$ carbon to grow. Hydrogen may also help stabilize the surface of the nanodiamonds.

Previous attempts to synthesize carbon nanoparticles by homogeneous nucleation have produced graphene or much larger diamond particles. The formation of nanodiamonds in a microplasma underscores the importance of quenching, which may be adjusted to limit the particle size to diamond's predicted thermodynamic stability at the nanoscale.

The formation of nanodiamonds at near-ambient conditions has wide-ranging scientific implications. The experimental confirmation of diamond-phase carbon produced at conditions far from its bulk thermodynamic stability provides support for theoretical predictions, and, preferably, the size at which this occurs (ca. 3 nm). The 'magic' size and structure of the material, including the more rare lonsdaleite phase, is consistent with characterization of interstellar diamond and suggests that a high-pressure history is not needed to explain their existence. The evidence for gas-phase nucleation in a plasma environment brings into question how diamond may be nucleated in conventional CVD processes and suggests that diamond particles could in some cases nucleate first in the gas phase, subsequently deposit on the substrate and act as seeds for film growth.

The process according to the embodiments of the present disclosure should also have several technological benefits. Compared with CVD, nanodiamonds are synthesized continuously at atmospheric pressure and as a powder. By fabricating arrays of microplasmas, it should be possible to produce large mass amounts (>1 g h$^{-1}$). The nanodiamonds are produced at significantly lower temperatures, which should enable the coating of plastics for flexible applications. Compared with detonation, the microplasma process is higher purity as metal and other impurities (for example, nitrogen and oxygen) are eliminated. Moreover, steep pressure and temperature gradients are avoided, which in detonation processes lead to fullerene shells and severe agglomeration, requiring extensive post-purification steps. Through the addition of H$_2$ gas, a path is shown to improve the purity of the diamond phase in flight, as opposed to acid treatment and air oxidation. Finally, the results indicate that the nanodiamonds produced by the microplasma process are significantly smaller than currently available material. Such particles may facilitate biological applications where the particle size is critical to transport and drug delivery. Overall, these differences suggest that it may be possible to further tune and optimize the microplasma process to ultimately control the particle size, surface chemistry and doping (for example, nitrogen) of the nanodiamonds for a wide range of applications.

Gas-Phase Nucleation and In Situ Aerosol Measurements

The experimental set-up for the synthesis of nanodiamonds is schematically illustrated in FIG. 3a. This method has been previously applied to the synthesis of silicon nanoparticles with diameters <5 nm. To nucleate and grow carbon nanoparticles, mixtures of Ar and H$_2$ gas and ethanol vapor were continuously introduced and dissociated in the microplasma at atmospheric pressure and near-ambient neutral gas temperature.

In one embodiment of the present disclosure, ethanol was chosen as the carbon precursor for several reasons. First, ethanol has been detected in interstellar gas and thus simulates a potential chemical environment for nanodiamond formation in outer space. Second, the C:H:O ratio of ethanol is within the predicted composition range for solid carbon precipitation and, by adding H$_2$, the ratio can be systematically tuned from non-diamond to diamond phase growth. Finally, ethanol has a suitable vapor pressure, not too high, resulting in excessive soot formation, but not too low, preventing particle nucleation.

Figure 3B:
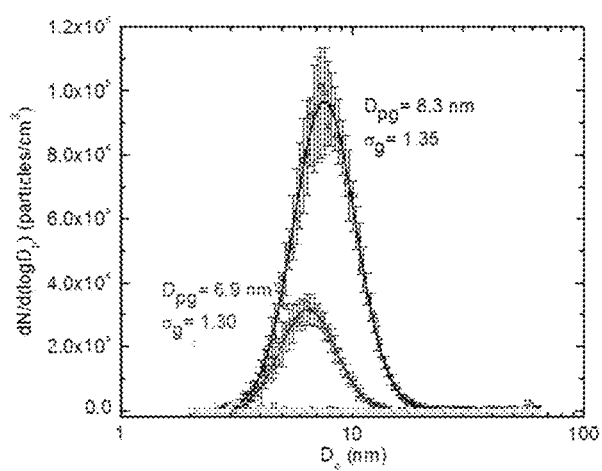

When ethanol vapor was introduced into the microplasma, the discharge turned a bright blue-green color as a result of C$_2$ emission (see FIG. 3a; color not shown). The neutral species gas temperature was estimated to be <100° C. using an infrared camera. The particles were collected at atmospheric pressure and room temperature by filtering the exiting aerosol flow with a fiber glass filter (see FIG. 3a). Particle formation was monitored in situ by aerosol size classification using a commercial scanning mobility particle sizing (SMPS) system. FIG. 3b shows particle size distributions (PSDs) for nanoparticles synthesized from 180 p.p.m. ethanol vapor in Ar and 180 p.p.m. ethanol vapor mixed with 450 and 10,000 p.p.m. H$_2$ gas in Ar. The PSDs represent an average of 10 scans collected by SMPS characterization after steady-state operation of the microplasma was reached. The raw data were fit to log-normal distributions to obtain the geometric mean diameters ($D_{pg}$) and s.d. ($\sigma_g$). It is noted that no particles were detected by the SMPS system for a pure Ar microplasma. The introduction of ethanol vapor produces a well-defined PSD, with a $D_{pg}$ of 8.3 nm at steady state. The addition of H$_2$ reduces the overall particle concentration and the $D_{pg}$ to 6.9 nm. Further increase in the gas-phase H$_2$ concentration to 10,000 p.p.m. completely quenches particle formation (see FIG. 3b). These results are consistent with the C—H—O phase diagram for carbon growth that shows increasing H with respect to C in the gas phase eventually suppresses solid carbon nucleation.

Optical Emission Spectroscopy (OES) of Precursor Dissociation

Figure 3C:
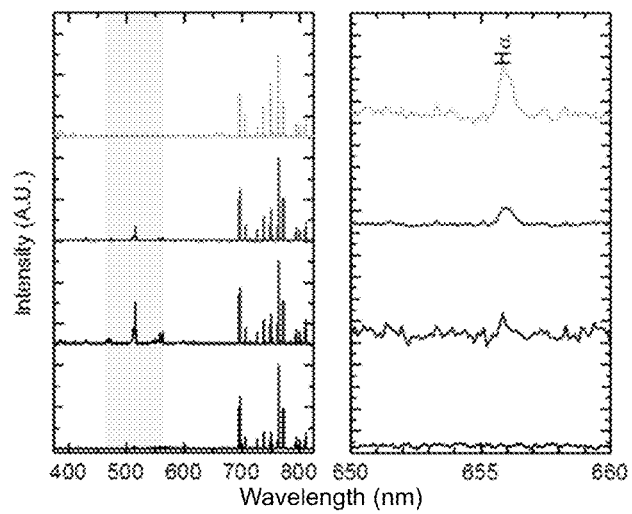

The dissociation of ethanol vapor and H$_2$ gas by the microplasma was confirmed by optical emission spectroscopy (OES). FIG. 1c shows spectra collected from the microplasma for varying mixtures of Ar, ethanol vapor and H$_2$ gas. All spectra show evidence of lines corresponding to Ar 4 p→4 s transitions in the higher wavelength regions (665-815 nm). When ethanol is introduced, additional peaks corresponding to the C$_2$ swan band between 460 and 570 nm (see left panel of FIG. 3c) and CH modes at 387 and 431 nm are observed. In addition, excited H$_2$ from the Fulcher-α band system ~600 nm was observed.

The confirmation of C$_2$ and CH radicals is particularly important for nanodiamond formation. Previous reports have shown that C$_2$ species initially nucleate a solid carbon cluster, and CH species form a hydrocarbon layer, promoting the nucleation of nanodiamonds; however, these experiments were carried out on films where the substrate may also influence nucleation. The addition of H$_2$ gas results in a new feature in the OES spectra at 656 nm corresponding to the H$_\alpha$ Balmer line (see right panel of FIG. 3c). To quantify this observation, the relative intensity of the H$_\alpha$ line was compared with an Ar-excited neutral line at 750.1 nm as a function of the gas-phase concentration of H$_2$. Increasing the H$_2$ gas concentration is found to increase the intensity of the H$_\alpha$ line and decrease the H$_2$ band intensity, which indicates that dissociation to atomic hydrogen is a more favorable reaction channel than molecular excitation. The increase in atomic hydrogen coincides with a decrease in the particle diameter (see FIG. 3b). Atomic hydrogen has been previously linked in CVD diamond growth to suppression of surface reconstruction, etching of non-diamond (sp$^2$) carbon and formation of surface radical sites by hydrogen abstraction, suggesting that the smaller particle size corresponds to selective removal of the non-diamond phase and stabilization of the diamond phase in our as-grown material.

Ultraviolet Micro Raman Spectroscopy

Figure 4A:
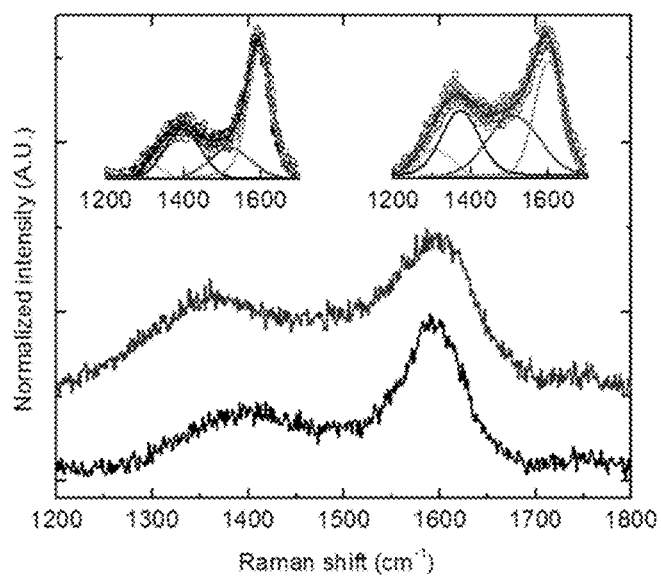
FIGS. 4a-4d illustrate material characterization of carbon nanoparticles.

The structure of the as-grown carbon nanoparticles was initially analyzed by micro Raman spectroscopy. Ultraviolet (UV) excitation (325 nm) was employed to enhance the scattering from the sp$^\alpha$ fraction in the samples. Raman spectra are shown in FIG. 4a for carbon nanoparticles synthesized with only ethanol vapor (black) and a mixture of ethanol vapor and H$_2$ gas (gray). Both spectra exhibit two broad features, one between 1,300 and 1,400 cm$^{-1}$ and another at ~1,600 cm$^{-1}$, close to the D (disorder) and G (graphite) bands, respectively, which arise from K-point phonon scattering of A$_{1g}$ symmetry and zone center phonon scattering of E$_{2g}$ symmetry, respectively, for sp$^2$ carbon materials. The first feature also overlaps with the well-known Raman scattering peak for bulk diamond at 1,332 cm$^{-1}$. The addition of H$_2$ gas is found to increase the peak intensity ratio of the first to the second feature, and shift the peak of the first feature to lower wavenumbers by ~40 cm$^{-1}$. A similar shift was also observed at other excitation wavelengths. A small shift in the peak of the second feature from 1,593 to 1,603 cm$^{-1}$ is also observed and maybe related to in-plane stretching of sp$^2$ carbon atoms resulting from strain introduced by the incorporation of hydrogen in the as-grown material. To further analyze the spectra, the features were deconvoluted and fit to Gaussian-Lorentzian curves. As shown in the left inset of FIG. 4a, the spectrum for nanoparticles synthesized with only ethanol vapor consists of a peak at 1,397 cm$^{-1}$ that can be assigned to amorphous carbon, and a weaker peak at 1,328 cm$^{-1}$. In comparison, the spectrum for nanoparticles synthesized with $H_2$ gas consists of two peaks at 1,307 and 1,372 cm$^{-1}$ (right inset of FIG. 4a), the former being significantly shifted to lower wavenumber and broadened. The confinement of optical phonons in nanodiamonds is known to cause a particle size-dependent shift to lower wavenumbers and broadening of the Raman scattering peak for bulk diamond.

Using a recently reported model, Raman spectra were simulated as a function of nanodiamond particle size. The calculated peak position and full width half maximum (FWHM) for 2.5-nm-diameter particles, 1,311 and 90 cm$^{-1}$, respectively, were found to agree well with the experimentally observed peak (1,307 cm$^{-1}$, FWHM=102 cm$^{-1}$). The UV micro Raman spectra of commercial nanodiamond samples were also obtained. A similar analysis showed that the commercial samples primarily contain particles between 4 and 6 nm, larger than the particles found in the instant samples.

X-Ray Diffraction

Figure 4B:
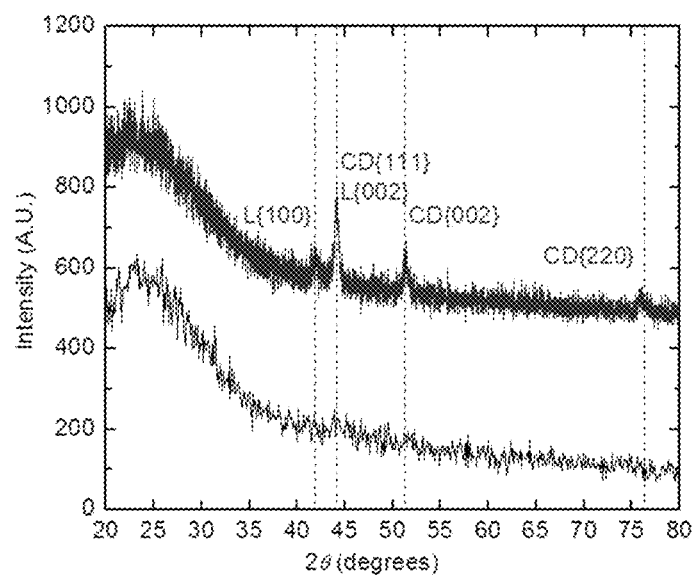

FIG. 4b shows X-ray diffraction (XRD) patterns of the same two samples of carbon nanoparticles that were characterized by Raman spectroscopy. The XRD pattern for nanoparticles synthesized with only ethanol vapor (black) shows a broad peak at ~25°, indicating that the material is mostly amorphous carbon, consistent with Raman analysis. In comparison, carbon nanoparticles synthesized from a mixture of ethanol vapor and $H_2$ gas (gray) exhibit clear diffraction peaks corresponding to lattice planes of various phases of diamond. A higher fraction of nanodiamonds in the sample grown with $H_2$ gas agrees with Raman analysis. The XRD peaks at 44.1°, 51.4° and 75.8° can be assigned to the (111), (002) and (220) lattice planes of cubic diamond, with a lattice parameter of 3.55 Å. It is noted that the (002) plane is a forbidden reflection for cubic diamond and corresponds to the n-diamond phase. The stability of n-diamond is a point of contention, but its existence has been reported in both experiments and theoretical calculations. The structure of n-diamond is believed to be face-centered cubic, with hydrogen atoms incorporated into the cubic carbon lattice. The formation of n-diamond is consistent with the increase in the concentration of atomic hydrogen with the addition of $H_2$ gas detected by OES. The peaks at 41.9° and 44.1°, the latter of which overlaps with cubic diamond, indicates the presence of lonsdaleite, with lattice constants of a=2.49 Å and c=4.11 Å. A mechanism for formation of lonsdaleite is not known, but this diamond phase is often found in meteorite samples. In comparison, XRD patterns of commercial nanodiamond samples only showed the presence of the cubic phase. It is noted that all XRD peak positions are slightly shifted towards higher 2θ values as compared with bulk diamond, highlighting the nanoscale nature of our material and suggesting lattice compression due to surface stresses.

X-Ray Photoelectron Spectroscopy

Figure 4C:
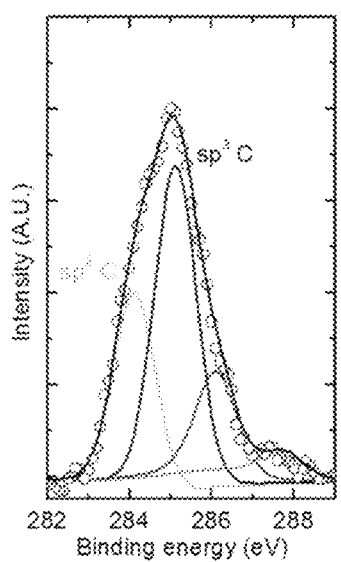
Figure 4D:
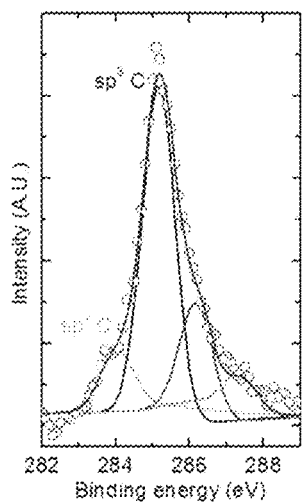

The purity of the diamond-phase in the as-synthesized carbon nanoparticles was assessed by X-ray photoelectron spectroscopy (XPS). From survey spectra, the metal content was found to be <0.1% in all samples. FIGS. 4c and 4d show high-resolution C 1 s XPS spectra collected from carbon nanoparticles synthesized with only ethanol vapor and a mixture of ethanol vapor and $H_2$ gas, respectively. XPS has been previously used to characterize the carbon bonding in amorphous carbon and nanodiamond powders using C 1 s spectra. Although XPS is generally known to probe the surface of materials, for carbon materials the inelastic mean-free path of C 1 s photoelectrons is ~3 nm. Thus, the whole volume of small nanoparticles, as in the case of the instant samples, was probed. The C 1 s signal of both samples consists of four chemically shifted components: peaks at ~284.0 and 285.0 eV corresponding to $sp^2$- and $sp^3$-hybridized carbon, respectively, and peaks at 286.1 and 287.4-287.7 eV corresponding to various hydrogen and oxygen functionalities including C—H, C—OH, C—O—C and C=O, in order of increasing binding energies. These peak shifts are in agreement with previous studies of nanodiamonds. Analysis was conducted on the $sp^2$ and $sp^3$ carbon peaks that arise from the presence of graphitic and diamond phases, respectively, in the samples. The $sp^3/sp^2$ carbon ratio increases substantially from 1.6 to 5.5 with the addition of $H_2$ gas, corresponding to an increase in the fraction of $sp^3$ carbon relative to $sp^2$ carbon from ~61 to 85%.

The reliability of XPS to assess the purity of the diamond phase with respect to the graphitic phase were validated by also characterizing several commercially available nanodiamond samples and found excellent agreement with reported values. Overall, the XPS results confirm that the addition of $H_2$ gas improves the as-synthesized purity of the nanodiamonds relative to non-diamond carbon. The in-flight purification of nanodiamond powder and removal $sp^2$ carbon by atomic hydrogen provides purified and stabilized nanoscale carbon diamonds.

Transmission Electron Microscopy

Figure 5A:
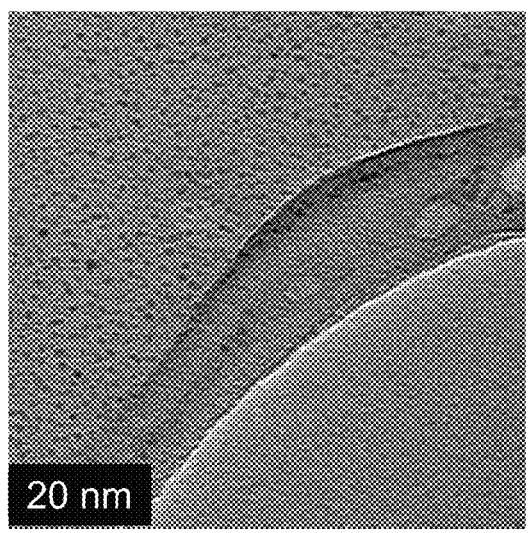
FIGS. 5a-5d illustrate TEM analysis of carbon nanoparticles. Representative TEM image of as-grown carbon nanoparticles synthesized by dissociation of only ethanol vapor in an atmospheric pressure microplasma shows evidence of unagglomerated, nanosized particles (FIG. 5a). The particles are roughly spherical and highly uniform in size. Scale bar, 20 nm.
Figure 5B:
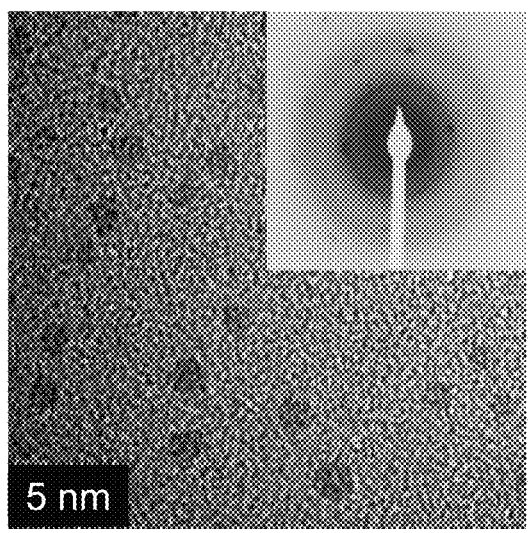
Figure 5C:
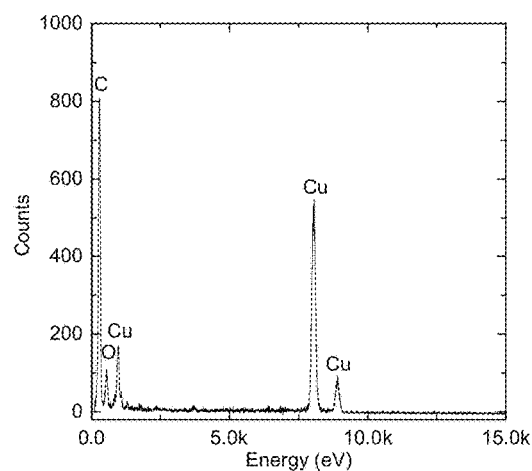

Additional microstructural characterization of our material was performed at the nanoscale by transmission electron microscopy (TEM). FIGS. 5a and 5b show representative TEM images of carbon nanoparticles synthesized from only ethanol vapor and drop-cast on carbon-coated Cu grids from a solution dispersion. The nanoparticles are unagglomerated (FIG. 5a), uniformly sized (FIG. 5b) and crystalline, as confirmed by selected-area electron diffraction (SAED; inset of FIG. 5b). The chemical composition of the particles was assessed by energy-dispersive spectroscopy (EDX). The EDX spectrum in FIG. 5c shows that the particles are free of impurities, in support of XPS results; peaks in the spectra from copper and oxygen are always present from the Cu grid and $O_2$ gas in the instrument background. A histogram obtained by sizing and counting ~250 individual particles from TEM images shows that the nanoparticles are mostly between 2 and 5 nm diameter (>90%). The monodispersity of the particles supports the existence of a 'magic' cluster size.

FIG. 6 shows high-resolution TEM analysis of individual particles whose random orientation allowed lattice fringes to be observed. The measured lattice spacings match up well with lattice planes of various diamond phases including lonsdaleite (100) (2.17 Å), cubic diamond (111) or lonsdaleite (002) (2.07 Å), lonsdaleite (101) (1.93 Å) and cubic diamond (002) (1.76 Å). The latter suggests the presence of the previously described n-diamond phase. Similar single-particle lattice spacing measurements were performed on ~50 particles and this analysis was combined with SAED and XRD to statistically assess the crystal structure of the nanodiamonds in the instant samples. Table 1 below summarizes the measured d spacings, all of which within error compare favorably with reported values for cubic diamond, n-diamond and lonsdaleite.

Figure 5D:
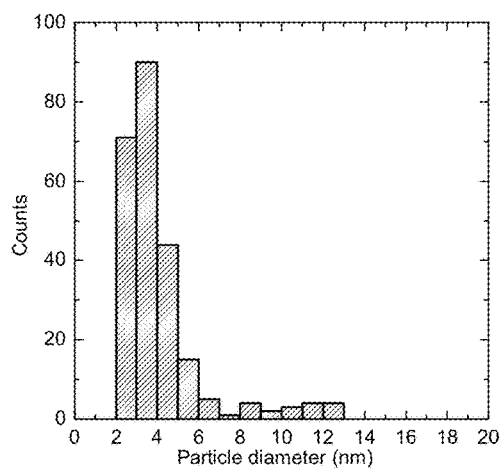
Figure 6A:
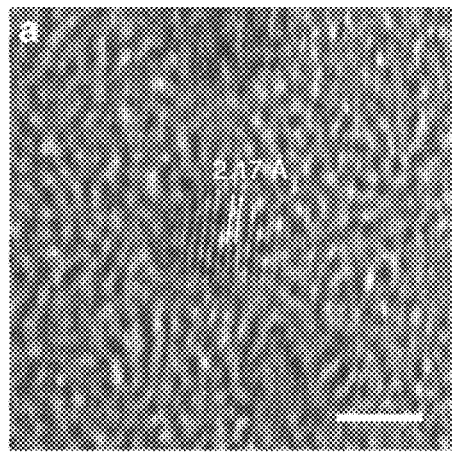
FIGS. 6a-6d illustrate high-resolution TEM of nanodiamonds. Measured lattice spacings of single particles correspond to the lonsdaleite (100) (FIG. 6a), cubic diamond (111) or lonsdaleite (002) (FIG. 6b), lonsdaleite (101) (FIG. 6c), and cubic diamond (002) (FIG. 6d) phases. Scale bars, 2 nm.
Figure 6B:
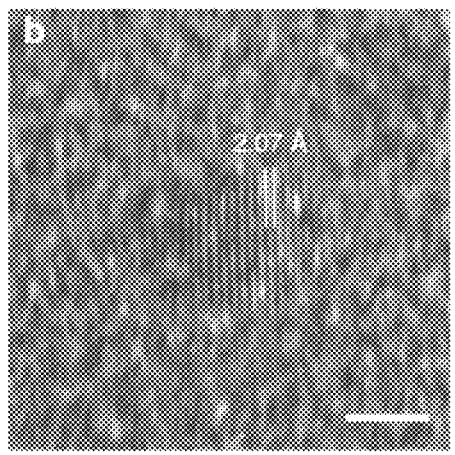
Figure 6C:
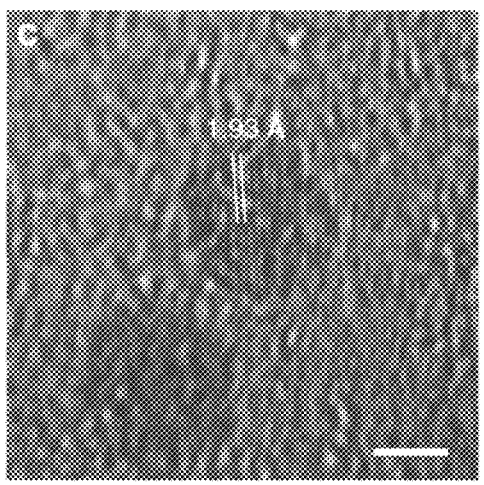
Figure 6D:
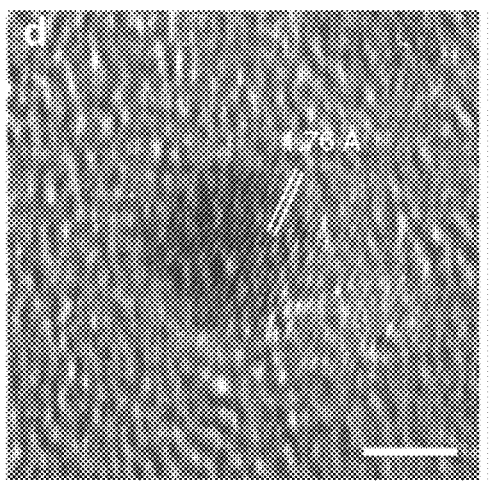
Figure 7A:
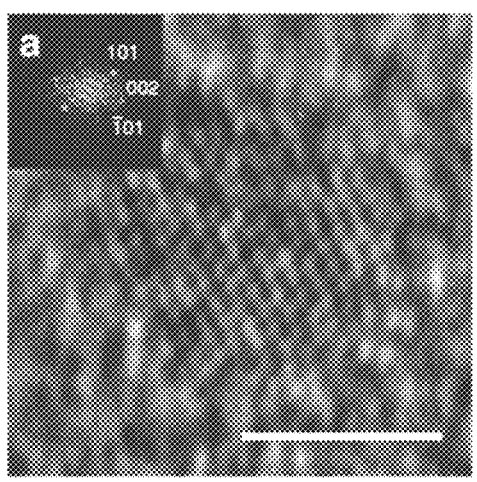
FIGS. 7a-7d illustrate single-particle analysis by FFT filtering.
Figure 7B:
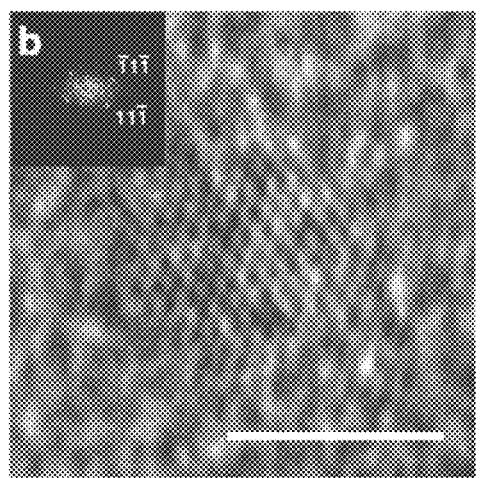
Figure 7C:
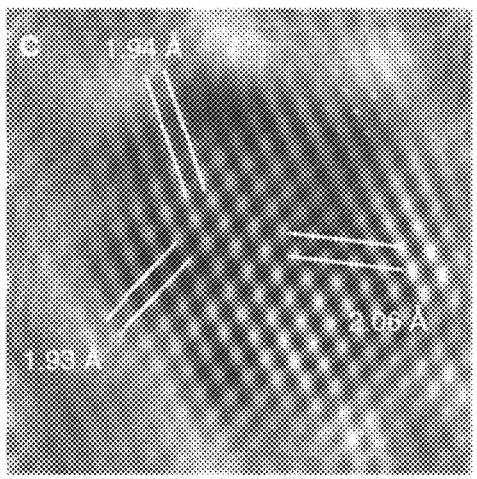
Figure 7D:
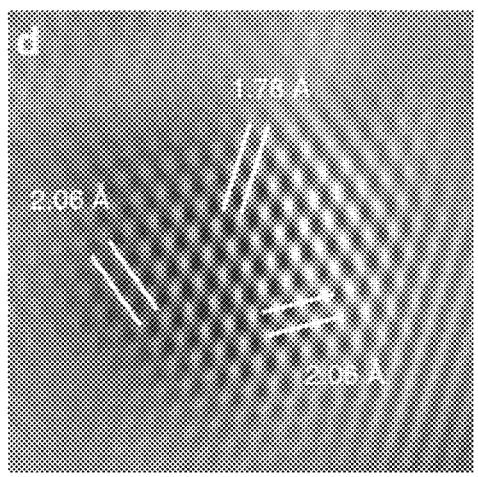
Figure 8A:
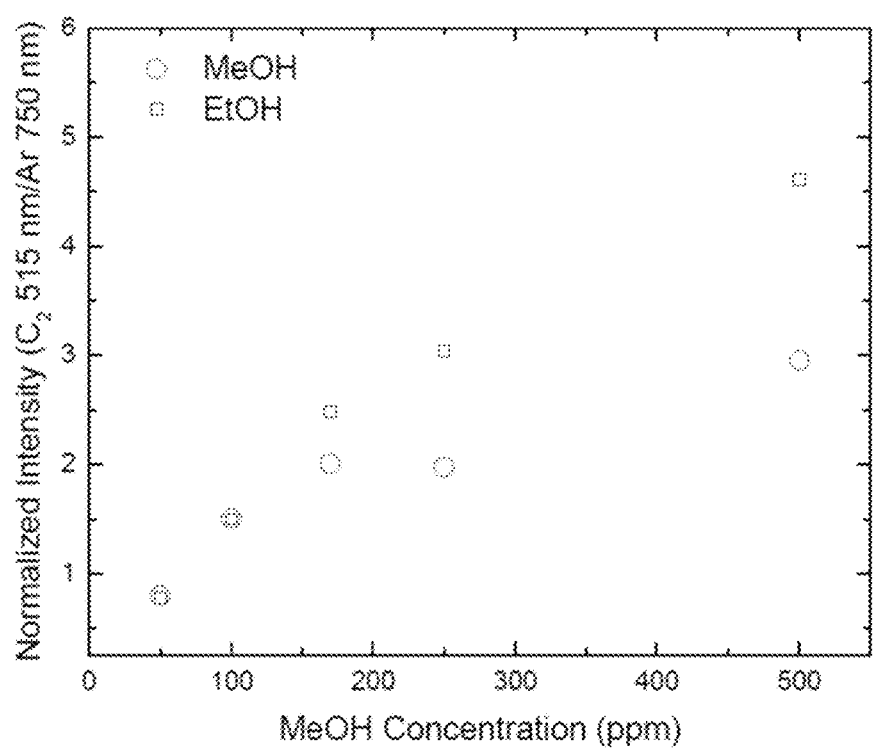

A small number of particles were appropriately oriented with the electron beam in TEM to allow more than one crystal plane of individual particles to be resolved. FIGS. 7a and 7b show high-resolution transmission electron microscopy images of two representative particles, both 3 nm in diameter. From the fast Fourier transform images (FFT; see insets of FIG. 7a), it was determined that the particles are lonsdaleite and n-diamond, imaged along the (010) and (110) zone axes, respectively. The measured lattice spacings from the corresponding inverse FFT images shown in FIGS. 7c and 5d validate the crystalline structure and are in excellent agreement with SAED and XRD results (see Table 1).

TABLE 1

Crystal Structure Analysis

| Measured d Spacings* | Cubic Diamond | | Lonsdaleite | | Frequency |
|---|---|---|---|---|---|
| (Å) | hkl | d Spacing (Å) | hkl | d Spacing (Å) | (%) |
| 2.16-2.20 | | | 100 | 2.18 | 26.3 |
| 2.04-2.08 | 111 | 2.06 | 002 | 2.06 | 39.5 |
| 1.90-1.96 | | | 101 | 1.93 | 23.7 |
| 1.74-1.78 | 002 | 1.78† | | | 10.5 |
| 1.51 | | | 102 | 1.5 | — |
| 1.25-1.31 | 022 | 1.26 | 110 | 1.26 | — |
| 1.15-1.18 | | | 103 | 1.16 | — |
| 1.11 | | | 020 | 1.092 | — |
| 1.06 | 113 | 1.075 | 112 | 1.075 | — |

Summary of measured d spacings of carbon nanoparticles and comparison with reported d spacings for cubic diamond and lonsdaleite. The frequency was obtained from TEM analysis of ~50 individual particles.
*Compilation of values from SAED, XRD and TEM analysis.
†Forbidden cubic diamond reflection (n-diamond).

Carbon nanoparticles synthesized by adding $H_2$ gas to the ethanol vapor in the microplasma were also analyzed by TEM. In comparison with carbon nanoparticles synthesized with only ethanol vapor, it was observed that the samples were much cleaner (less amorphous carbon), consistent with micro Raman, XRD and XPS characterization. The particles were unagglomerated and crystalline, with similar particle sizes and crystal structures as those synthesized with only ethanol vapor. Commercial nanodiamond samples imaged by TEM were found to be comparatively larger in size (>5 nm), in agreement with Raman characterization, and severely agglomerated.

EXAMPLES

Microplasma Synthesis and Aerosol Mobility Measurements

Carbon nanoparticles were synthesized in the gas phase at atmospheric pressure and room temperature by continuously dissociating ethanol vapor in a microplasma. The microplasma was formed between a stainless steel capillary tube (outer diameter=1.59 mm, inner diameter=0.178 mm) and a stainless steel mesh (2×4 mm$^2$) electrode, operated as the cathode and anode, respectively. The electrodes were separated by a gap of 2 mm and sealed inside a quartz tube (OD=6.35 mm) with Swagelok gas fittings. The microplasma was ignited with a negatively biased, high-voltage, direct-current power supply (Power Designs Inc., Model HV-1547), ballasted by a power resistor (500 kΩ). The discharge was operated at a constant current of 3.6 mA in all experiments.

Controlled concentrations of ethanol vapor were introduced into the microplasma by bubbling Ar gas through a solution of pure ethanol (200 proof, Decon Labs, Inc.) cooled to −10° C. (*P=0.1079 psi, 5,000 p.p.m.). This flow was then diluted twice, first with a flow of 460 s.c.c.m. Ar, and then with a flow of 55 s.c.c.m. Ar after exhausting a flow of 455 s.c.c.m. Thus, a final concentration of 180 p.p.m. ethanol in Ar at a total gas flow rate of 100 s.c.c.m. was introduced into the microplasma. From aerosol measurements, it was found that this ethanol concentration was optimal to nucleate a steady-state concentration of carbon nanoparticles for over 100 h. Alternatively, $H_2$ gas were introduced either directly into the microplasma at a concentration of 10,000 p.p.m. or with Ar through the bubbler for a final $H_2$ concentration of 450-1,800 p.p.m. in the microplasma.

In situ aerosol measurements of as-synthesized carbon nanoparticles were performed with a scanning mobility particle sizer (SMPS) system (TSI, Inc., Model 3936) consisting of a differential mobility analyzer and a butanol-based condensation particle counter. To avoid Brownian coagulation, the particles exiting the microplasma were diluted with a flow of $N_2$ gas.

Optical Emission Spectroscopy

OES of the microplasma was carried out by collecting the emitted light with a 600-μm-diameter fiber optic cable coupled to a spectrometer (Ocean Optics Inc., Model HR400). Line intensities were calibrated with a tungsten halogen light source. Spectra were integrated 10 times with an acquisition time of 100 ms.

Collection of Carbon Nanoparticles

As-synthesized carbon nanoparticles were collected by continuously trapping the aerosol product exiting the microplasma on commercial filters with pore sizes <1 μm including stainless steel, poly-fluorotetraethylene and glass fiber. In most cases, glass fiber filters (Millipore Inc.) that did not contribute any background signal in micro Raman spectroscopy and XRD were used. The mass of collected product was obtained by weighing the filter before and after collection.

Micro Raman Spectroscopy and Phonon Confinement Model

Micro Raman spectroscopy was carried out at various excitation wavelengths. Excitation in the visible range was performed with an inVia Renishaw spectrometer equipped with three lasers at λ=488, 514 and 633 nm. To enhance the scattering from the sp$^3$ component relative to the sp$^2$ component of the material uses, UV excitation at λ=325 nm was performed with a Jobin-Yvon LabRAM HR800 spectrometer.

The Raman spectra were fit to a refined phonon confinement model for diamond, which relates the intensity of the Raman scattering to the size of the particles:

$$I(\omega) \cong \int_0^1 \frac{\exp(-q^2 L^2 / 4) 4\pi q^2}{[\omega - \omega(q)]^2 + (\Gamma/2)^2} dq \quad (1)$$

where I is the intensity, L is the size of the particles, ω is the phonon dispersion curve, q is the wave vector and Γ is the FWHM of the scattering peak. Γ and ω (q) are given by the following polynomial functions:

$$\Gamma = A + \frac{B}{L^2} \quad (2)$$

where A=11 cm$^{-1}$ and B=491.25 cm$^{-1}$ and $$\omega(q) = A + B \cdot q + C \cdot q^2 + D \cdot q^3 + E \cdot q^4 + F \cdot q^5 \quad (3)$$

where A, B, C, D, E and F are coefficients for seven different phonon branches ($\Lambda_1$, $\Lambda_3$, $\Sigma_1$, $\Sigma_2$, $\Sigma_3$, $\Delta_2$ and $\Delta_5$) corresponding to scattering from various crystalline phases of diamond.

XRD

XRD was carried out with a Scintag X-1 advanced X-ray diffractometer using monochromated Cu-Ka radiation ($\lambda$=1542 nm). All XRD patterns were collected from a 2θ of 20°-80°, with a step size of 0.01°, at a grazing incident angle of 2° to enhance the sensitivity from our relatively thin samples. From the XRD peaks, d spacings were calculated using Bragg's equation (nλ=2 d sin θ). For d spacings corresponding to cubic or n-diamond, the lattice parameter, a, was calculated using the following equation:

$$\frac{1}{d_{hkl}^2} = \frac{h^2 + k^2 + l^2}{a^2} \quad (4)$$

and for d spacings corresponding to the lonsdaleite phase of diamond, the lattice parameters, a and c were calculated using the following equation (where a=b≠c):

$$\frac{1}{d_{hkl}^2} = \frac{4}{3} \cdot \frac{(h^2 + hk + l^2)}{a^2} + \frac{l^2}{c^2} \quad (5)$$

XPS

XPS was performed with a PHI VersaProbe using a monochromatic Al Kα X-ray (1486.6 eV) source. Samples for XPS were either prepared by collecting on glass fiber filters to assess the metal impurities or directly depositing on single crystal Si substrates using a nanometer aerosol sampler (TSI, Inc., Model 3089) to characterize the relative fraction of diamond ($sp^3$ carbon) and non-diamond ($sp^2$ carbon) phases. Before nanoparticle deposition, the Si substrates were cleaned with acetone to remove residual carbon. After deposition, the samples were sputtered inside the XPS instrument by an Ar ion beam to remove contamination (for example, adventitious carbon) that occurred during sample transfer. In all cases, spectra were taken with a spot size of 300 mm. High-resolution C 1 s spectra were acquired with a step size of 0.1 eV from a minimum of two spots on each sample and averaged. The binding energies were corrected to compensate for surface charging. The spectra were deconvoluted and fit using the PHI Multipak program from ULVAC-PHI, Inc. by a Lorentz—Gauss algorithm after subtracting a Shirley background.

TEM and EDX

TEM was carried out with a Philips Tecnai F30 field-emission electron microscope operated at 300 kV. TEM samples were prepared by carefully shaking the filter-collected carbon nanoparticles in methanol and drop casting on carbon-coated Cu grids. Sonication was avoided to prevent the filter from breaking up. EDX was performed with a 130-eV energy resolution Li-drift Si detector. Additional structural information was obtained by SAED and FFT.

While the present disclosure has been described with reference to certain embodiments, other features may be included without departing from the spirit and scope of the present invention. It is therefore intended that the foregoing detailed description be regarded as illustrative rather than limiting, and that it be understood that it is the following claims, including all equivalents, that are intended to define the spirit and scope of this invention.

The invention claimed is:

1. A method of forming nanoscale diamond particles, the method comprising:
   providing $C_2$ and CH radicals at a low pressure;
   nucleating the $C_2$ and CH radicals to form, in a gas phase, carbon nanoparticles comprising a diamond phase and a non-diamond phase; and
   removing at least a portion of the non-diamond phase in flight during the nucleation of the $C_2$ and CH radicals to form, in the gas phase, a carbon powder comprising a plurality of nanoscale diamond particles.

2. The method of claim 1, wherein providing $C_2$ and CH radicals at a low pressure comprises dissociating a carbon feed into $C_2$ and CH radicals at a low pressure.

3. The method of claim 2, wherein dissociating a carbon feed into $C_2$ and CH radicals comprises flowing a vapor of the carbon feed into a plasma at a low pressure to form the $C_2$ and CH radicals.

4. The method of claim 3, wherein the plasma comprises a microplasma.

5. The method of claim 2, wherein the carbon feed has a C/(C+O) ratio of about 0.45 to about 0.57.

6. The method of claim 2, wherein the carbon feed is selected from the group consisting of an alcohol, CO, a mixture of a low-carbon alkane, alkene or alkyne and $H_2$ or $O_2$, and a combination thereof.

7. The method of claim 2, wherein the carbon feed is selected from the group consisting of methanol, ethanol, CO, $CH_4$, $C_2H_6$, $C_2H_4$ and $C_2H_2$, and a combination thereof.

8. The method of claim 2, wherein the carbon feed is mixed with hydrogen, oxygen or both.

9. The method of claim 1, wherein removing at least a portion of the non-diamond phase in flight comprises etching the non-diamond phase of the carbon nanoparticles.

10. The method of claim 9, wherein the etching step comprises hydrogen or oxygen etching.

11. The method of claim 10, wherein hydrogen or oxygen is provided together with the $C_2$ and CH radicals.

12. A method of forming nanoscale diamond particles, the method comprising:
   providing $C_2$ and CH radicals at a low pressure;
   nucleating the $C_2$ and CH radicals to form carbon nanoparticles comprising a diamond phase and a non-diamond phase;
   removing at least a portion of the non-diamond phase in flight during the nucleation of the $C_2$ and CH radicals to form a carbon powder comprising a plurality of nanoscale diamond particles; and
   quenching the nucleating step.

13. A method of forming nanoscale diamond particles, the method comprising:
   providing a plasma at a low pressure;
   continuously flowing a vapor of a carbon feed into the plasma, the vapor of the carbon feed dissociating in the plasma to form free radicals;
   nucleating the free radicals to form, in a gas phase, carbon nanoparticles comprising a diamond phase and a non-diamond phase; and
   etching the non-diamond phase of the carbon nanoparticles in flight during the nucleation of the free radicals to form, in the gas phase, a carbon powder comprising a plurality of nanoscale diamond particles.

14. The method of claim 13, further comprising introducing an etchant into the plasma, wherein the non-diamond phase of the carbon nanoparticles is etched by the etchant in flight during the nucleation of the free radicals.

15. The method of claim 14, wherein the etchant comprises hydrogen, oxygen or both.

16. The method of claim 13, wherein the vapor of carbon feed further comprises a carrier gas.

17. The method of claim 13, wherein the nanoscale diamond particles have a concentration in the carbon powder of at least about 87% by weight.

18. The method of claim 13, wherein the nanoscale diamond particles comprise one or more crystal structures selected from the group consisting of lonsdaleite, cubic diamond, and n-diamond.

19. The method of claim 13, wherein the average particle size of the plurality of nanoscale diamond particles is about 3 nm or less.

* * * * *